March 9, 1937.  E. GAYFORD ET AL  2,073,148

FLOTATION OF MINERALS

Filed June 14, 1934  2 Sheets-Sheet 1

INVENTORS:
ERNEST GAYFORD
J. HOWARD HEGINBOTHAM
PHILIP D. P. HAMILTON

BY
ATTORNEYS

March 9, 1937. E. GAYFORD ET AL 2,073,148
FLOTATION OF MINERALS
Filed June 14, 1934 2 Sheets-Sheet 2
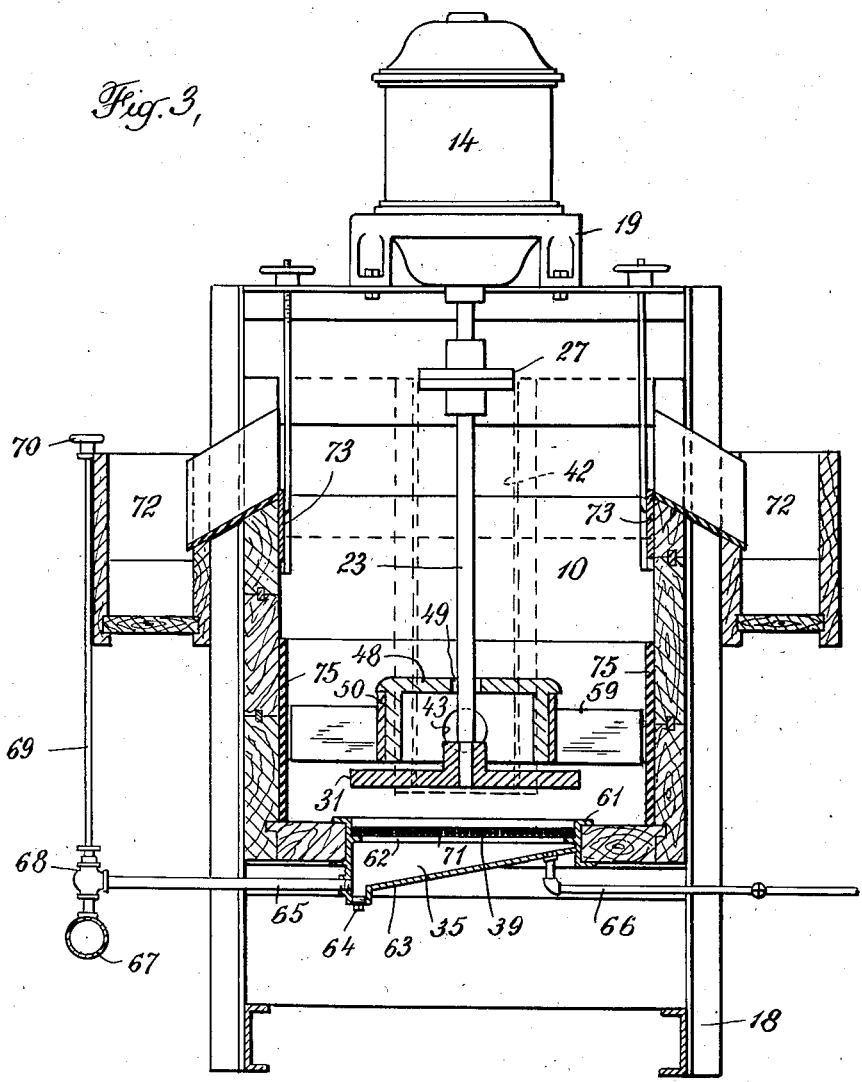
Fig. 3,
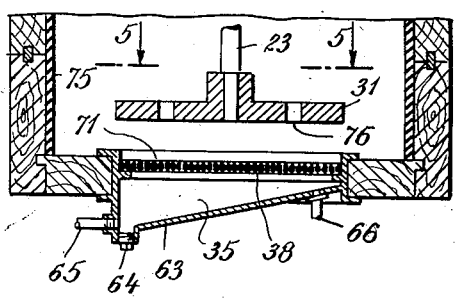
Fig. 4,
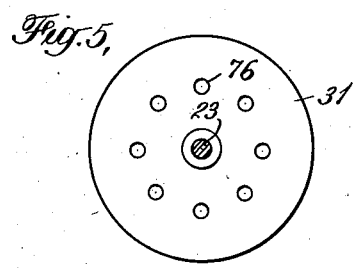
Fig. 5,
INVENTORS:
ERNEST GAYFORD
J. HOWARD HEGINBOTHAM
PHILIP D. P. HAMILTON
BY
ATTORNEYS Patented Mar. 9, 1937

2,073,148

UNITED STATES PATENT OFFICE 2,073,148

FLOTATION OF MINERALS

Ernest Gayford and Joseph Howard Heginbotham, Salt Lake City, Utah, and Philip D. P. Hamilton, Toronto, Ontario, Canada, assignors to The General Engineering Company, a corporation of Utah Application June 14, 1934, Serial No. 730,542

17 Claims. (Cl. 209—168)

This invention relates to the flotation of materials, particularly of minerals, and has for its object certain improvements in the method of and apparatus for concentrating minerals and the like by froth flotation.

It is common to concentrate minerals by impelling outside air through an inlet in the bottom of a flotation cell. The bottom of the cell is equipped centrally with an air inlet pipe, the far end of which extends exteriorly of the cell into the open atmosphere above the normal pulp level of the cell. A cruciform (4-blade) impeller fits into the bottom of the cell, directly above the air inlet pipe. In operation the cell is filled with mineral pulp, conditioned with appropriate flotation reagents before or after entry into the cell, and the impeller blades are rotated at high speed. The whirling blades tend to drive the pulp from the bottom of the cell, a vacuum is created behind the blades, and the air inlet pipe is thereby placed under suction; as a result of which outside air is drawn through the pipe into the cell and beaten into the pulp. Air thus introduced is subjected to super-atmospheric pressure in the zones in front of the impeller blades and is thereby forced into solution. During the flotation step this air is released from solution and rises as bubbles through the pulp body. Mineral laden froth gathers on the surface of the pulp, overflows into a launder and is suitably collected.

The impeller action of the whirling blades is so vigorous that the pulp is violently agitated. Rapid movement of the blades is necessary in order to break up and disperse air sucked through the pipe into the cell. Violent agitation of the pulp, however, has a number of drawbacks. The top surface of the pulp body is vigorously disturbed, and this disturbance spreads to the mineral laden froth immediately adjacent the pulp surface. Air bubbles in this portion of the layer of mineral froth break up and release their suspended mineral particles. These mineral particles tend to sink toward the bottom of the cell, are again selectively attached to rising air bubbles, and may again be caused to sink. As a result of this repeated rising and sinking operation, froth is lost, more power is consumed to operate the cell and the efficiency of the froth flotation step is impaired.

In addition to rising and sinking repeatedly, these mineral particles likewise tend to obstruct and hinder rising bubbles to which mineral particles have already been selectively attached. Many of these attached mineral particles are released, and tend to fall toward the bottom of the cell until they are again gripped by rising bubbles.

Due to the violent agitation of the pulp by the impeller blades, gangue particles are kept in rapidly moving suspension and tend to bombard rising air bubbles, thereby breaking away mineral particles selectively attached to the bubbles.

While the whirling impeller blades operate to break-up and disperse atmospheric air admitted through the pipe in the bottom of the cell, the air is not uniformly and minutely disseminated throughout the pulp body. Relatively large bubbles of air tend to rise from the air pipe inlet and pass through the wide, open spaces between the moving impeller blades without being broken down, at least into the minute and substantially uniform bubbles that are most desired in froth flotation. These large air bubbles explode violently on reaching the surface of the pulp body and passing into the layer of mineral laden froth supported thereon. As a result of this explosion, many smaller air bubbles burst and release their mineral burden. This of course tends to lower the efficiency of the froth flotation operation.

As a result of our investigations, we have developed certain improvements that tend materially to overcome the froth flotation difficulties just discussed. We have discovered that an adequate amount of air may be introduced into a flotation cell, uniformly and minutely broken up, and thoroughly disseminated in the pulp body, without at the same time unduly agitating the pulp itself. The pulp is sufficiently agitated to keep the mineral particles in suspension, but not to the extent made necessary in the operation of the flotation cell above referred to.

In accordance with our invention, air under pressure is introduced into the bottom of a body of mineral pulp undergoing froth flotation. The air is passed upwardly against the wet bottom of a disc, which is revolved at a speed sufficiently high to split-up and disperse the air in minutely disseminated form throughout the pulp body without undue agitation of the pulp. To this end an air inlet is advantageously placed in the bottom of the cell; a disc air diffuser is positioned directly above the air inlet, and means are provided for revolving the disc at high speed.

In a present preferred practice of the invention the compressed air is passed upwardly through a porous medium, such as canvas or minutely perforated elastic rubber sheet, which of itself operates to form a myriad of small bubbles of uniform size. These small bubbles rise and strike the liquid moving under the bottom of the revolving disc. Due to the high speed of the moving disc, the small bubbles are substantially instantaneouly split-up or sub-divided into much smaller or minute bubbles of practically uniform size. These minute bubbles are continuously spread out laterally into the pulp by the disc or disc action.

Since the disc is smooth, flat, circular and concentrically mounted, it revolves about its central axis with little disturbance to the pulp. A swirling motion may be imparted to the pulp, but this may be inhibited for the most part, if desired, by the use of suitably placed baffles. An arm impeller of the cruciform type, such as described above, functions to agitate the pulp violently, whereas the pulp may be held relatively quiescent when using a disc air diffuser. The disc air diffuser, unlike the arm impeller, does not act as an impeller to suck air into the cell. Optimum air dispersion may be obtained with a disc while at the same time not unduly agitating the pulp.

Since the disc is in liquid it is wet and covered with a thin sheet or layer of liquid pulp medium and this sheet or layer is rotated as the disc rotates.

These and other features of the invention will be better understood if reference is made to the accompanying drawings, taken in conjunction with the following description in which:

Fig. 3 is an end elevation in section along the line 3—3 of Fig. 1;

Fig. 4 is a fragmentary end elevation in section illustrating a modification of the invention; and Fig. 5 is a section on the line 5—5 of Fig. 4.

Figure 1:
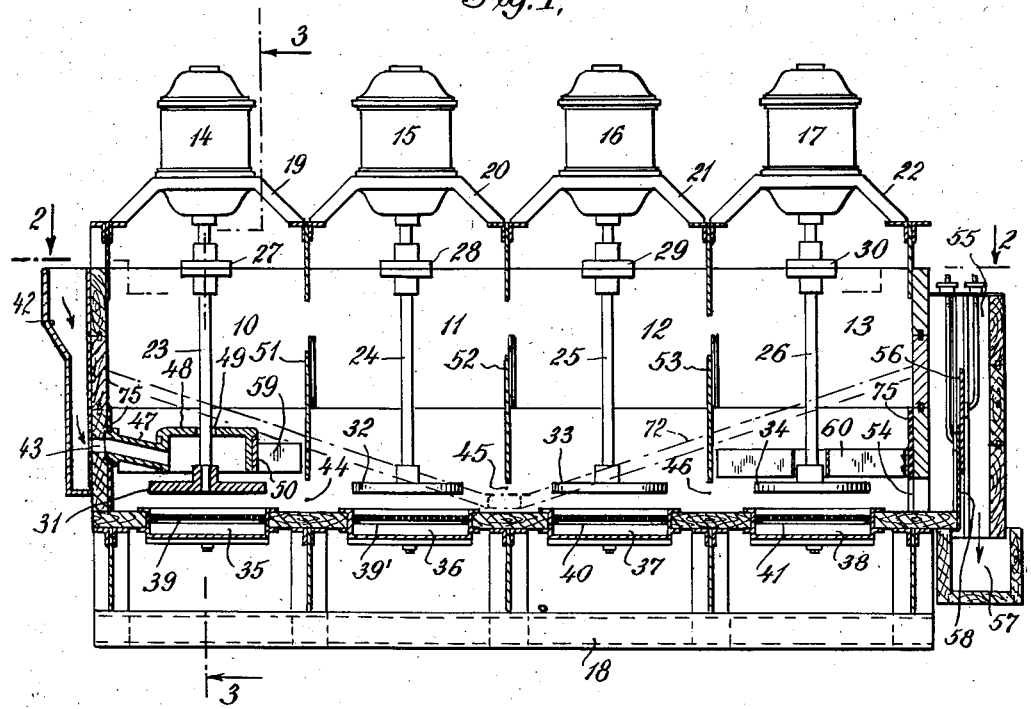
Fig. 1 is a side elevation of apparatus constructed in accordance with the invention, the view being taken along the line 1—1 of Fig. 2.
Figure 2:
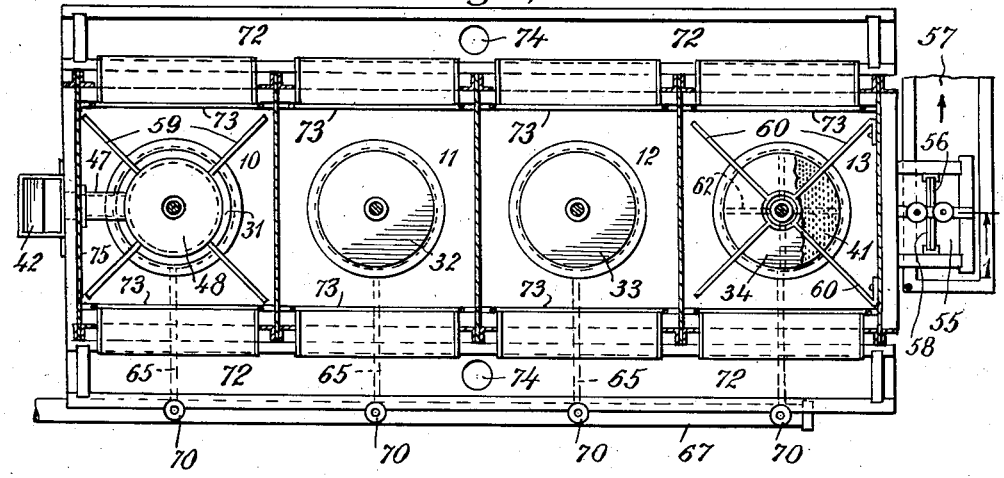
Fig. 2 is a top view in section along the line 2—2 of Fig. 1.

Referring to Figs. 1 and 2, it will be seen that the apparatus shown comprises a series of connected flotation compartments 10, 11, 12 and 13, each of which is provided with a superposed motor, 14, 15, 16 and 17, respectively. It will be clear that a different motor arrangement may be employed, if desired. For example, the motor in each case may be supported from a framework attached to the cell, and the disc shaft, to be described, may be rotated by means of a Tex-rope drive. The cell is mounted on a supporting structure 18. Each motor in the series of compartments rests on a support frame 19, 20, 21 and 22, respectively.

A shaft 23, 24, 25 and 26 depends centrally of each compartment in the series, the upper end of the shaft being attached to the shaft of its corresponding motor by means of a coupling 27, 28, 29 and 30. The lower end of each shaft is provided with a blank circular disc air diffuser, 31, 32, 33 and 34, disposed horizontally directly above the bottom of the compartment. An air distributing chamber 35, 36, 37 and 38 is fitted into the bottom of each compartment. Each air distributing chamber is provided with an air-porous medium 38, 39, 40 and 41, which is circular in shape and somewhat smaller in diameter than the disc mounted directly above.

A mineral pulp feed box 42 connects with the first compartment in the series through a passageway 43 near the bottom thereof. The compartments connect one another at their bottoms by means of open passageways 44, 45 and 46.

It will be understood that various means may be employed to feed pulp into the first compartments in the series. The device more particularly shown in Fig. 1 consists of an inclined conduit 47 integral with an annular cap member 48 adapted to fit, in part, directly over disc 31. An opening 49 is provided in the top of the cap member to receive disc shaft 23. It will be noted that baffles 59 are attached to an annular ring 50, which fits snugly around the cap member. The annular ring is preferably split in two segments which are provided with means (not shown) for bolting them tightly around the cap member. Adjustable baffles 51, 52 and 53 are provided for controlling the flow of pulp through the compartments through the open passageways along the bottom of the compartments.

The last compartment in the series is provided at its bottom with a tailings discharge-passageway 54 communicating with an overflow weir box 55. This box is equipped with an adjustable overflow weir 56 and a tailings discharge-launder 57. An adjustable sand bleeder gate 58 fits against the bottom of the overflow weir box.

The first compartment in the series is advantageously provided with spoke-like baffles 59, which may be comparatively narrow, and are located directly above the disc. A similar set of baffles 60 is advantageously provided in the last compartment in the series. Similar or equivalent baffles may of course be provided in the other compartments.

If reference is now made to Fig. 3, the first compartment in the series may be considered in more detail, particularly with respect to the air distributing chamber; which is similar in construction for each compartment. The chamber is advantageously constructed as a separate unit, which may be built into the bottom of the flotation compartment as shown. It consists of a circular channel side wall 61 adapted to fit tightly into the compartment bottom. The porous medium fits across transverse supports 62 secured to the channel side wall. The bottom 63 of the chamber slopes as shown, a removable clean-out plug 64 being provided in a sump at the lowermost part of the chamber. An air inlet pipe 65 connects the air distributing chamber at its lowermost point. A water inlet pipe 66 connects with the chamber, and is employed to clean out the same, when desired.

Each air distributing chamber in the series of compartments is provided with an air inlet pipe which connects laterally with a header pipe 67, by means of a valve 68. For convenience, the valve stem 69 rises vertically a suitable distance so that its handle 70 may be freely turned by an operator.

The porous medium employed in conjunction with the air distributing chamber may be made of any suitable material. A canvas or mat, may, for example, be employed. In the present preferred practice of the invention, an elastic porous rubber sheet is employed. The rubber sheet is advantageously perforated with a multiplicity of uniformly distributed definite apertures 71. The apertures preferably have a longitudinal section of dumb-bell configuration. They are definite clear holes, minute in size and have a definite measurable effective diameter not exceeding about 1/50 of an inch, and not smaller than about 1/200 of an inch. These apertures, furthermore, preferably number not less than about 50 and not more than about 500 per square inch of aerating area in the rubber sheet. Sheets of about $\frac{1}{16}$ of an inch in thickness are satisfactory. Porous perforated rubber sheets or blankets provided with from 150 to 350 holes per square inch, the effective or clear diameter of which is from 1/100 to 1/150 of an inch, are giving excellent results.

Still referring to Fig. 3, and also Fig. 2, it will be seen that each compartment connects exteriorly on each side with a sloping overflow launder 72 running lengthwise of the entire series of compartments, by means of an adjustable overflow lip 73. The launders taper downwardly toward the bottom of the central compartments, and terminate in openings 74 through which their contents may be discharged.

Each compartment is advantageously provided with a protecting liner 75 of either rubber, iron, steel, or the like. The compartment walls may be constructed of wood, steel or cast iron.

Whereas the air diffuser discs shown in Figs. 1, 2 and 3 are of the blank circular type, the disc shown in Figs. 4 and 5 is suitably perforated, as shown. The holes 76 in the disc are such as to give adequate air dispersion in operation without at the same time unduly agitating mineral pulp.

It will be clear that a single cell or any number of compartments within a cell may be employed in series or in any other suitable combination, depending upon the practice to be followed and the results to be obtained.

In operation, mineral pulp is continuously conducted into feed box 42, thus filling flotation compartments 10, 11, 12 and 13 in the series. Baffles 51, 52 and 53, overflow weir 56 and overflow lips 73 are suitably adjusted to their proper heights for operation. The pulp is conditioned with flotation reagents either before or after introduction into the compartments. Air under pressure is at the same time introduced into distributing chambers 35, 36, 37, and 38. The air rises upwardly through the porous mediums 38, 39, 40 and 41 to produce a myriad of very small air bubbles substantially uniform in size.

Motors 14, 15, 16 and 17 are started and their depending disc air diffusers 31, 32, 33 and 34 are rotated at high speeds. When the small air bubbles rise upwardly from the porous media and strike the wet bottoms of the rapidly revolving discs, they are substantially instantaneously split-up into smaller and more minute air bubbles, substantially uniform in size. The smaller bubbles are promptly thrown laterally into the pulp beyond the perimeter of the disc, and rise upwardly through the pulp body above the disc. A steady and continuous stream of the more finely divided air bubbles is thus formed and dispersed in the pulp.

Due to the thinness of the disc air diffusers, and their circular shapes, little frictional resistance is offered by the pulp; and the pulp itself does not become unduly agitated, however, since the disc is in direct contact with the pulp body, it drags a relatively thin layer of pulp with it. Since the pulp flows through the conduit 77 into the annular cap member 78, the revolving disc distributes the pulp laterally into the first compartment. The disc thus tends to cover and protect the porous medium 39. At the high speed employed to split-up and disperse the small air bubbles rising from the porous medium, the disc necessarily sets up a slight swirling motion of the pulp. If such swirling motion is objectionable, use is advantageously made of baffles such as illustrated in the first and last compartments in the series. The mixing action of the discs is a maximum in their own immediate vicinity, the pulp itself being relatively quiescent at and near the top surface. Minerals to be concentrated are selectively gripped by the rising air bubbles and are carried upwardly into a layer of froth maintained on the surface of the pulp. Mineral laden froth continuously moves cross the overflow lips 73 into the common launders 72.

Froth flotation of selected minerals takes place in each succeeding compartment in the series. Tailings ultimately pass through the passageway 54 from the last compartment in the series to the overflow weir box 55. Sand that does not remain in suspension but clings to the bottom of the last compartment in the series may be directly removed from the bottom by suitably elevating the sand bleeder gate 56.

Low pressure air is advantageously admitted through the porous medium. The resulting small bubbles are promptly split-up and dispersed by the revolving disc, thus causing an intimate mixing of air and pulp which is highly conducive to the production of a froth of even texture. In accordance with the present invention both the volume and pressure of the air thus employed may be accurately controlled. The froth flotation operation may, therefore, be accurately controlled. Each compartment is independently operated in a manner to fit in with the operation of the other compartment to produce optimum results.

We have found that the ratio of compartment area to disc area, and ratio of compartment area to air mat area, should be maintained within reasonable limits. Our experimental work indicates that the ratio of compartment area to disc area should be approximately 3.8 to 1, and that the ratio of cell area to air mat area should be approximately 5.68 to 1; and that for a cell 24 inches square the disc should be about 14 inches in diameter, the air mat 12 inches in diameter, and the peripheral speed of the disc from about 2200 to 2500 feet per minute. A 1½ horse power motor is ample to revolve each disc shaft.

It will be clear to those skilled in this art that the principles of the method and apparatus disclosed are applicable to a variety of uses. While minerals may be effectively floated in accordance therewith, other materials may likewise be floated.

We claim:

1. In a flotation machine, the improvement comprising an air distributing chamber in the bottom of a cell, the chamber being covered at least in part with a sheet of elastic material provided with a multiplicity of uniformly distributed definite apertures whose longitudinal section is of dumb-bell configuration through which air may be passed, an essentially blank disc air diffuser positioned directly above the air chamber, and means for revolving the disc at high speed.

2. In a flotation machine, the improvement comprising an air distributing chamber in the bottom of a cell, the chamber being covered at least in part with a sheet of elastic material provided with a multiplicity of uniformly distributed definite apertures whose longitudinal section is of dumb-bell configuration through which air may be passed, a blank circular disc air diffuser positioned directly above the air chamber, and means for revolving the disc at high speed.

3. In a flotation machine, the improvement comprising an air distributing chamber in the bottom of a cell, the chamber being covered at least in part with a sheet of elastic material provided with a multiplicity of uniformly distributed definite apertures whose longitudinal section is of dumb-bell configuration through which air may be passed, an essentially blank disc air diffuser containing a few perforations positioned directly above the air chamber, and means for revolving the disc at high speed.

4. In a flotation machine, the improvement comprising an air distributing chamber in the bottom of a cell, the chamber being covered at least in part with a sheet of elastic material provided with a mulplicity of uniformly distributed definite apertures whose longitudinal section is of dumb-bell configuration through which air may be passed, a disc air diffuser to split-up and disperse air admitted through said elastic material, and a pulp feeding conduit positioned above said disc air diffuser so that pulp passed through the conduit may be discharged therefrom directly over the revolving member.

5. In a flotation machine, the improvement comprising a cell provided with a plurality of compartments connecting one another in series by open passageways in adjoining walls, each compartment being provided with an air distributing chamber in the bottom thereof, the chambers being covered at least in part with a sheet of elastic material containing a multiplicity of uniformly distributed definite apertures whose longitudinal section is of dumbbell configuration through which air may be passed, a disc air diffuser horizontally positioned directly above each air chamber, means for revolving the discs at high speed, a mineral pulp feed box associated with the first compartment in the series, an annular cap member directly above the disc in the first compartment in the series, and a pulp feeding conduit connecting the pulp feed box with the cap member.

6. In a flotation machine, the improvement comprising a cell provided with a plurality of compartments connecting one another in series by open passageways in adjoining walls, each compartment being provided with an air distributing chamber in the bottom thereof, the chambers being covered at least in part with a sheet of elastic material containing a multiplicity of uniformly distributed definite apertures whose longitudinal section is of dumbbell configuration through which air may be passed, a disc air diffuser horizontally positioned directly above each air chamber, means for revolving the disc at high speed, mineral pulp feeding means associated with the first compartment in the series, an annular cap member directly above the disc in the first compartment in the series, a pulp feeding conduit connecting said mineral pulp feeding means with the cap member, and at least one baffle located in the first compartment at a level directly above its disc to inhibit any tendency of mineral pulp confined in the compartment to swirl during flotation operations.

7. A flotation machine according to the preceding claim, in which said baffle is attached to an annular ring that fits snugly around said annular cap member.

8. In a flotation machine, the improvement comprising a cell provided with a plurality of compartments connecting one another in series by open passageways in adjoining walls, each compartment being provided with an air distributing chamber in the bottom thereof, the chambers being covered at least in part with a perforated medium containing a multiplicity of apertures through which air may be passed, a disc air diffuser horizontally positioned directly above each air chamber, means for revolving the disc at high speed, mineral pulp feeding means associated with the first compartment in the series, an annular cap member directly above the disc in the first compartment in the series, and a pulp feeding conduit connecting said mineral pulp feeding means with the cap member.

9. In the froth flotation of minerals, the improvement which comprises dividing a stream of moving air under positive pressure into a multiplicity of small bubbles, introducing the small bubbles into the bottom of a body of mineral pulp undergoing froth flotation, permitting substantially all of said small air bubbles to rise upwardly in the body of mineral pulp for a short distance, splitting substantially all of the small air bubbles into minute air bubbles by contact with a rapidly moving layer of the pulp, dispersing the minute air bubbles thus split up laterally in the body of mineral pulp, disseminating the minute air bubbles throughout the pulp body, and permitting the disseminated minute air bubbles to rise into a relatively quiescent portion of the pulp.

10. In a flotation machine, the improvement comprising a cell provided with a plurality of compartments connecting one another in series by open passageways, each compartment being provided with an air distributing chamber in the bottom thereof, the chambers being covered with a porous medium through which air under pressure may be passed into the compartments in the form of small bubbles, a relatively thin and essentially blank disc air diffusor horizontally positioned directly above each air chamber, said disc having a sufficiently large bottom surface area adapted to strike substantially all of the air bubbles that rise from said porous medium, means for revolving the discs at high speeds, pulp-feeding means associated with the first compartment in the series, and tailings-discharge means associated with the last compartment in the series.

11. In a flotation machine, the improvement comprising a cell provided with an air distributing chamber in the bottom thereof, the chamber being covered with a porous medium through which air under pressure may be passed into the cell in the form of small bubbles, a relatively thin and essentially blank disc air diffusor horizontally positioned directly above said chamber, said disc having a sufficiently large bottom surface area adapted to strike substantially all of the air bubbles that rise from said porous medium, and means for revolving the discs at high speed.

12. In a flotation machine, the improvement comprising a cell provided with a plurality of compartments connecting one another in series by open passageways in adjoining walls, means for feeding pulp into the first compartment in the series, the bottom of each compartment being provided with an air distributing chamber, the tops of said chambers being provided with a porous medium through which air under positive pressure may be passed into the compartments in the form of small bubbles, a disc air diffuser horizontally positioned directly above each air distributing chamber, said disc having a sufficiently large bottom surface area adapted to strike substantially all of the air bubbles that rise from said porous medium, means for revolving the discs at high speed so that when the small bubbles strike the bottoms of the discs they are split-up into minute bubbles that are promptly thrown laterally beyond the perimeters of the discs, said discs being relatively thin and circular in shape to minimize frictional resistance offered by the pulp, and means connected with the bottom of the last compartment in the series for removing tailings.

13. In a flotation machine, the improvement comprising a cell adapted to contain a body of pulp, the bottom of the cell being provided with an air distributing chamber, the stop of said chamber being provided with a porous medium through which air under positive pressure may be passed into the cell in the form of small bubbles, a disc air diffuser horizontally positioned directly above the air distributing chamber, said disc having a sufficiently large bottom surface area adapted to strike substantially all of the air bubbles that rise from said porous medium, means for revolving the disc at high speed so that when the small bubbles strike the bottom of the disc they are split-up into minute bubbles that are promptly thrown laterally beyond the perimeter of the disc, said disc being relatively thin and circular in shape to minimize frictional resistance offered by the pulp, and means connected with the bottom of the cell for removing tailings.

14. In a method of froth flotation of mineral-bearing pulp, the improvement which comprises introducing simultaneously a multiplicity of small air bubbles into the pulp at the lower portion thereof, laterally rotating a relatively thin sheet of pulp directly above the place where the bubbles are introduced, permitting the bubbles to rise into contact with the rotating sheet, said bubbles being forced outwardly beyond the influence of the rotating sheet from which point they rise in the pulp, and maintaining the upper portion of the pulp body in a relatively quiescent state.

15. In the froth flotation of minerals, the method which comprises introducing simultaneously a multiplicity of small gas bubbles into a relatively quiescent zone of a pulp body, laterally moving a layer of pulp in the pulp body and directly above the place where the bubbles are introduced, permitting the bubbles to rise until their upward movement is interrupted by the moving layer of pulp, said bubbles engaging said moving layer and being carried outwardly and laterally to a point where the lateral movement ends, and then permitting the bubbles thus laterally moved to rise in a relatively quiescent body of pulp.

16. In the froth flotation of minerals, the method which comprises charging a multiplicity of air bubbles into the lower portion of a pulp body and permitting the bubbles to rise in the pulp, laterally rotating a relatively thin sheet of pulp in the path of the rising bubbles, all of said bubbles rising in the path of said rotating sheet of pulp engaging said sheet and being drawn outwardly, releasing the bubbles in a zone in the pulp body concentric with the rotating sheet, and permitting the bubbles to rise into a relatively quiescent body of pulp above the rotating sheet of pulp.

17. In the froth flotation of minerals, the method which comprises introducing a multiplicity of gas bubbles into a relatively quiescent portion of a pulp body, permitting the bubbles to rise in the pulp body, subdividing the bubbles under the action of a rapidly rotating disc and moving and resulting smaller bubbles laterally, said laterally moving bubbles being released from the action of the rotating disc and permitted to rise in the pulp, and maintaining the upper portion of the pulp body in which the smaller bubbles rise in a relatively quiescent state.

ERNEST GAYFORD.
J. HOWARD HEGINBOTHAM.
PHILIP D. P. HAMILTON.

CERTIFICATE OF CORRECTION.

Patent No. 2,073,148.   March 9, 1937

ERNEST GAYFORD, ET AL.

It is hereby certified that error appears in the printed specification of the above numbered patent requiring correction as follows: Page 2, first column, line 74-75, for the word "compartments" read compartment; page 3, second column, line 4, for "cross" read across; lines 29 and 30, after "of" insert cell or; line 33, for "compartment" read cell; page 5, first column, line 7, claim 13, for "stop" read top; and second column, line 31, claim 17, for "and" read the; and that the said Letters Patent should be read with these corrections therein that the same may conform to the record of the case in the Patent Office.

Signed and sealed this 27th day of April, A. D. 1937.

(Seal)

Leslie Frazer
Acting Commissioner of Patents.